Sept. 8, 1931.  R. E. WEBER  1,822,469
SEPARATION APPARATUS FOR FOOD REMNANTS
Filed Jan. 26, 1928   3 Sheets-Sheet 1
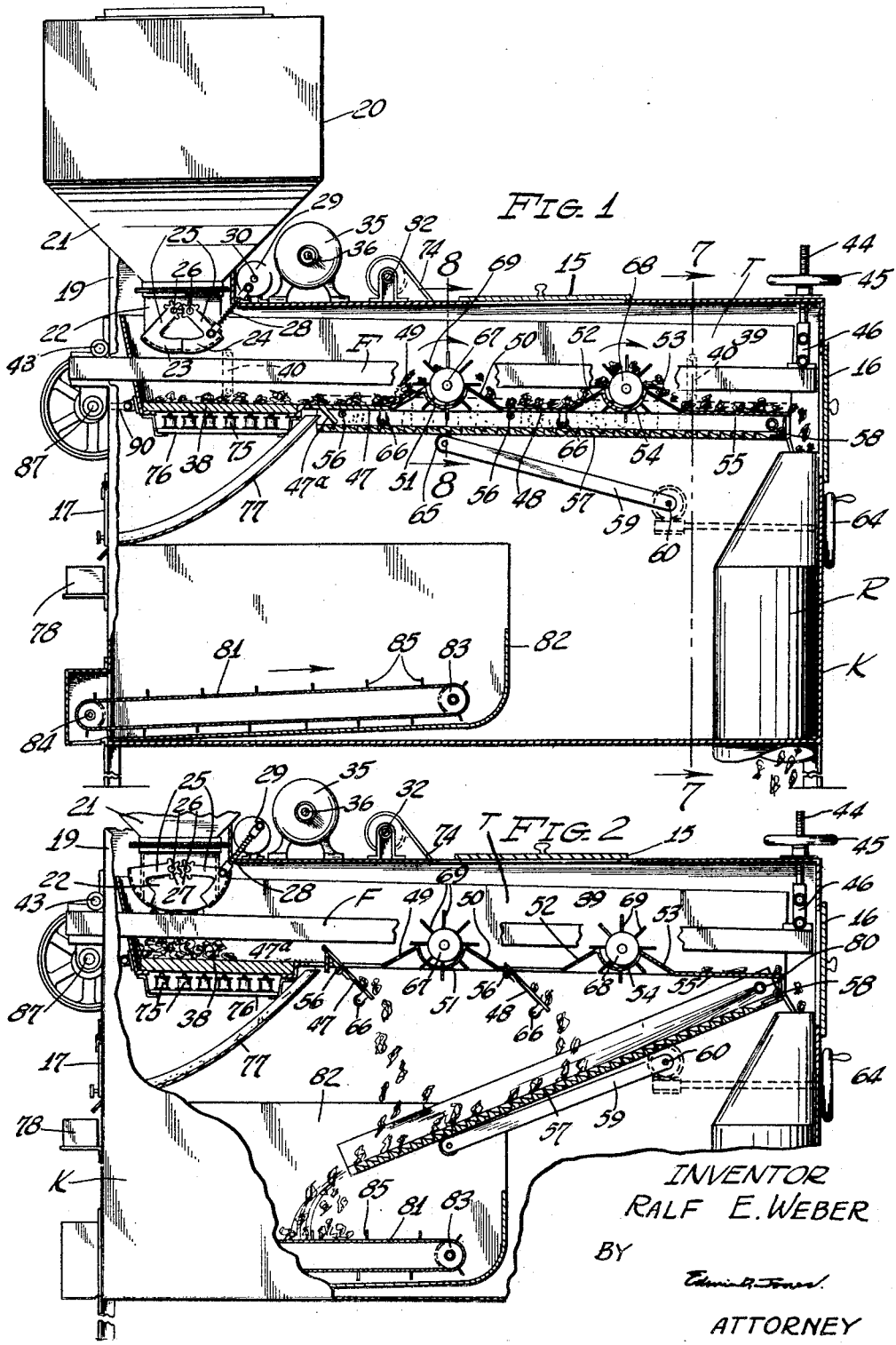

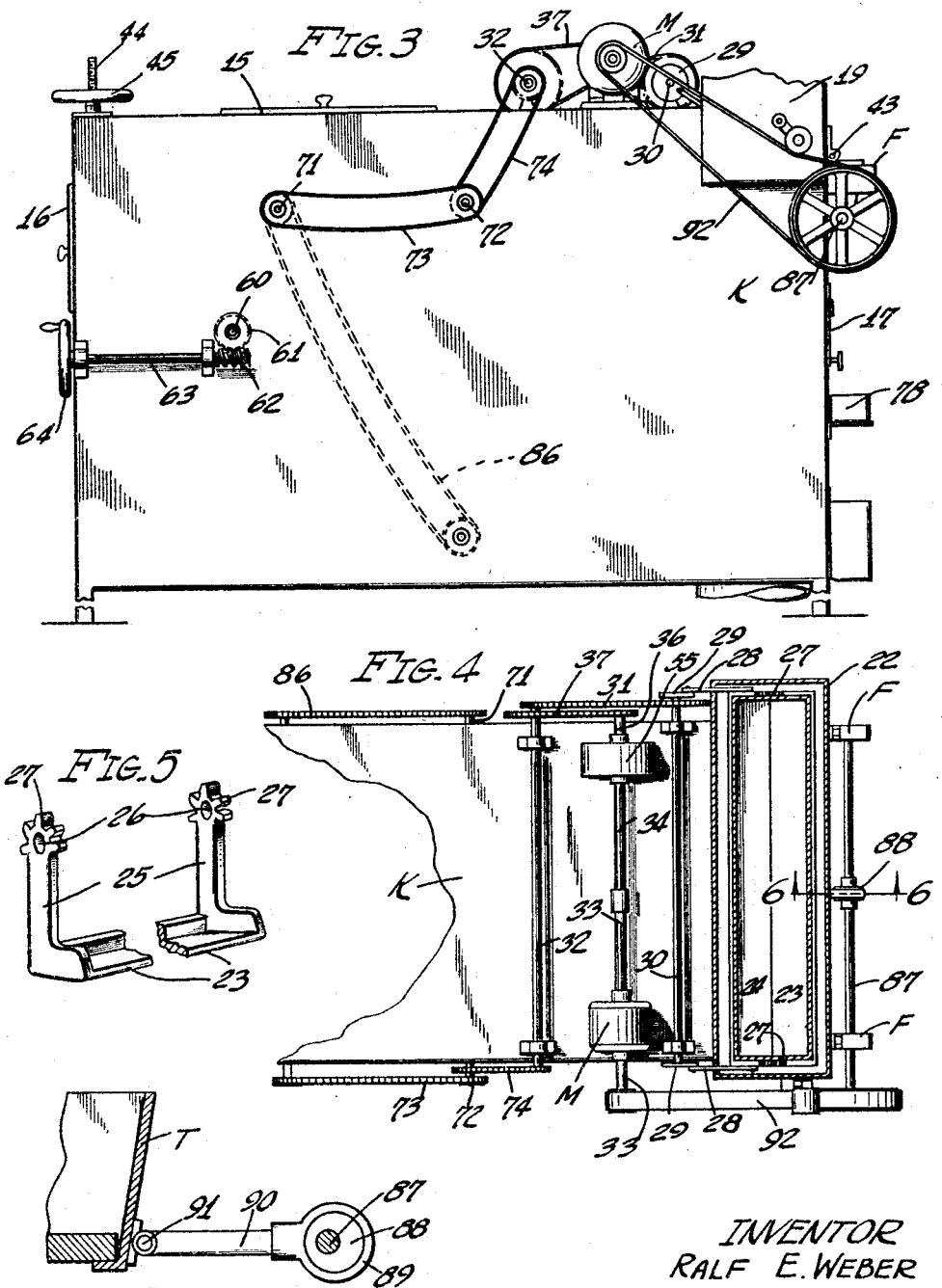

Sept. 8, 1931.  R. E. WEBER  1,822,469
SEPARATION APPARATUS FOR FOOD REMNANTS
Filed Jan. 26, 1928    3 Sheets-Sheet 3
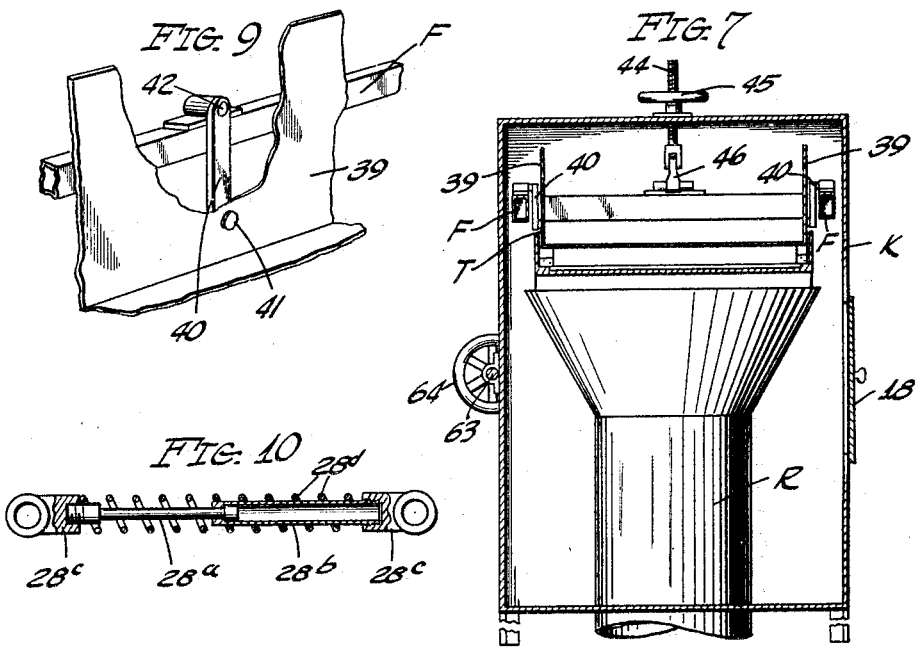
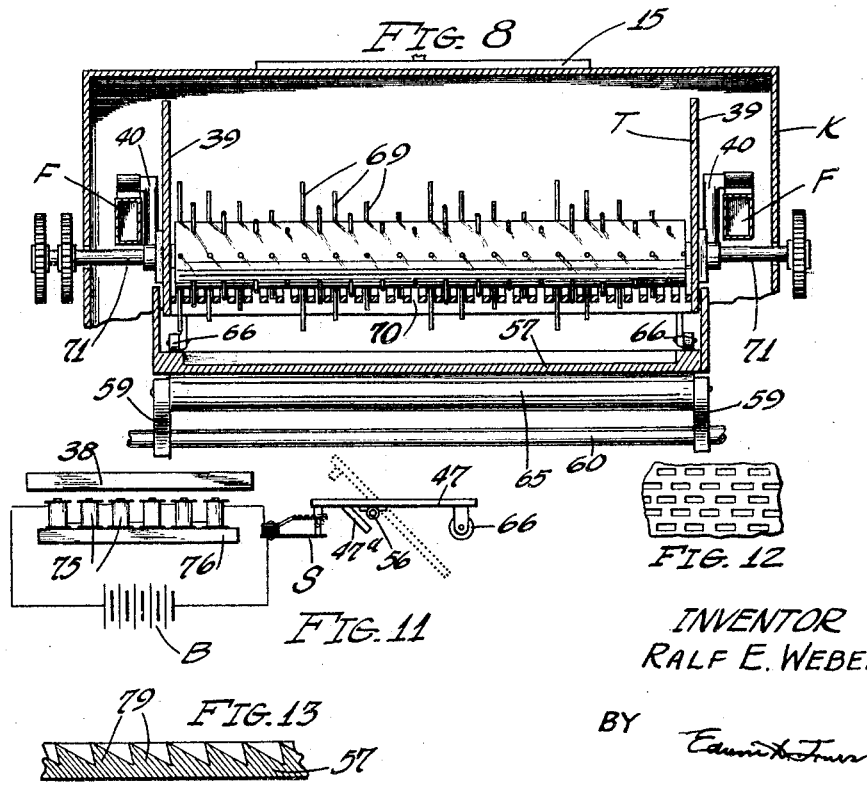
INVENTOR
RALF E. WEBER
BY
ATTORNEY Patented Sept. 8, 1931

1,822,469

UNITED STATES PATENT OFFICE

RALF E. WEBER, OF OAKLAND, CALIFORNIA, ASSIGNOR TO ARTHUR U. MAGNAN, OF LOS ANGELES, CALIFORNIA

SEPARATION APPARATUS FOR FOOD REMNANTS

Application filed January 26, 1928. Serial No. 249,672.

My invention has reference to the heat treating of kitchen and table food remnants, commonly known as garbage, by which they are converted into a valuable food product for poultry and live stock. Although food produced in this manner is highly nutritious and palatable to live stock, and particularly swine, it has been found to be injurious to the animals and in a great many instances fatal by reason of the presence therein of unrelated matters such as particles of glass, china, and metal.

It is a purpose of my invention to provide an apparatus by which the food remnants can be subjected to a preliminary treatment preceding the heat treating and grinding thereof, and in which objectionable and injurious matters, such as glass, china and metal, and relatively large bones are separated from the valuable particles of food so as to produce in the final product a food free from any unrelated matters which may injure the animals to which it is fed.

I will describe only one form of separation apparatus for food remnants, and will then point out the novel features in claims.

In the accompanying drawings:

Fig. 1 is a view showing in vertical longitudinal section one form of separation apparatus for food remnants embodying my invention with the parts thereof in position to effect the separation treatment of food remnants;

Fig. 2 is a view similar to Fig. 1 showing the apparatus in position to effect dumping of accumulated unrelated matters an operation necessary from time to time to render the apparatus effective to separate the unrelated matters;

Fig. 3 is a view showing the apparatus in side elevation and reversed with respect to the showing in Fig. 1;

Fig. 4 is a fragmentary plan view of the apparatus shown in Fig. 3 with the hopper and gates in section;

Fig. 5 is an enlarged detail perspective view of one of the gates embodied in the apparatus;

Fig. 6 is an enlarged fragmentary vertical sectional view showing the mechanical means for vibrating the table of the apparatus;

Figs. 7 and 8 are vertical transverse sectional views taken on the lines 7—7 and 8—8, respectively, of Fig. 1;

Fig. 9 is a fragmentary perspective view illustrating one of the connections between the frame and table embodied in the apparatus by which the table is supported for oscillatory movement;

Fig. 10 is an enlarged view partly in section showing one of the connections employed for opening and closing the gates;

Fig. 11 is a view somewhat diagrammatic showing one means of controlling energization of the electro-magnets embodied in the apparatus;

Fig. 12 is a fragmentary plan view of the table embodied in the apparatus illustrating one of the perforated portions thereof; and Fig. 13 is an enlarged fragmentary vertical sectional view of the riffle plate embodied in the apparatus.

Similar reference characters refer to similar parts in each of the several views.

In carrying out my invention, I provide a housing or casing designated generally at K and which is shown as being of rectangular form and of a size sufficient to accommodate the mechanisms by which the separation or removal of unrelated matters from the food remnants is effected. Doors 15, 16, 17, and 18 are provided in the housing by which access may be had to the mechanisms therein for the purpose of inspection and other obvious reasons. The top of the housing at one end thereof is provided with an upwardly extending portion 19 in which is supported a hopper 20 having a conical shaped bottom 21 merging into a discharge spout 22 from which the discharge of material is controlled by a pair of gates 23 and 24. These gates are provided with arms 25 pivoted at the points indicated at 26 on the ends of the spout 22 so that the gates swing in arcuate paths to conform to the rounded edges of the discharge spout. The arms 25 are provided with intermeshing pinions 27 so that movement of the gate 24 to open or closed position will effect the corresponding movement of the gate 23.

By means of connecting rods 28 the gate 24 is operatively connected at its ends to disks 29 and in such manner that rotation of the disks effects reciprocation of the rods to intermittently open and close the gate 24 and, consequently, the gate 23. In order to render the rods 28 immune to breakage by reason of an obstacle becoming lodged between the gates to prevent their closing, each rod is constructed in the manner illustrated in Fig. 10 in which it will be seen that a rod $28^a$ telescopes within the tubular rod $28^b$, the outer ends of the two rods being threaded in bearing members $28^c$. A spring $28^d$ is interposed between the bearing members so as to yieldably urge the rods to the extended position shown and to thereby provide a normal rigid rod in its entirety to form the necessary operative connection between the disk 29 and the gate 24. However, should an obstacle become lodged between the gates 23 and 24 to prevent their closing, the spring $28^d$ will yield under the rotative movement of the disk 29, thereby permitting the rods $28^a$ and $28^b$ to telescope one within the other and thus prevent the transmission of motion to the gate 24.

The disks 29 are fixed to the opposite ends of the shaft 30 (Fig. 4), and by means of a chain and sprocket connection 31 the shaft 30 is operatively connected to and driven by a shaft 32. The shaft 32 in turn is driven by the shaft 33 of an electric motor M, the shaft 33 being connected to a shaft 34 and the latter to a conventional form of a reductional gearing 35 by which a shaft 36 is driven at relatively low speed to actuate the shaft 32 through a chain and sprocket connection 37.

Into the hopper 20 the food remnants to be treated are adapted to be dumped, and through the medium of the gates 23 and 24 the discharge of the food remnants from the hopper is automatically controlled and rendered intermittent so that the food remnants are discharged in batches onto a table, designated generally at T, and more particularly onto a plate or platform 38 forming a part of the table. The table is mounted for oscillatory movement in order that it may be vibrated by a suitable mechanism, and in the present instance this table is of U form in cross-section, as illustrated in Fig. 7, in order to provide side portions 39 to which links or hangers 40 are pivotally connected, as indicated at 41 in Fig. 9. There are four of these hangers, as will be seen from an inspection of Fig. 1, and the upper ends of each hanger is pivotally mounted, as indicated at 42, on a rectangular frame indicated at F. As shown in Fig. 1, the frame F extends through one end of the housing K where it is hingedly mounted on the housing, as indicated at 43. The opposite end of the frame can be manually adjusted vertically by the provision of a screw 44 and a wheel 45 mounted thereon, with the screw operatively connected to the frame by means of a link 46 so that by rotation of the wheel 45 in one direction or the other the screw 44 will be moved upwardly or downwardly in the housing K to correspondingly elevate or lower the frame F. The purpose of this adjusting means is to permit a variation in the inclination of the frame F and hence a corresponding variation in the inclination of the table T for a purpose to be described hereinafter.

In the present embodiment of my invention, the bottom of the table T, in addition to including the plate or platform 38 comprises one or more tiltable platforms. As illustrated, there are employed two such platforms, indicated at 47 and 48, arranged one in advance of the other and between which is a stationary platform having oppositely inclined portions 49 and 50 between which is a curved portion 51. At the opposite side of the platform 48 is a second stationary platform constructed in the same manner as the first stationary platform with the respective parts thereof indicated at 52, 53, and 54. The inclined portion 53 slopes downwardly to a flat and stationary platform 55 at the discharge end of the table. The platforms 47 and 48 normally occupy the horizontal position shown in Fig. 1 to coact with the stationary platforms in providing an uninterrupted surface over which the food remnants are adapted to be moved. The platforms 47 and 48 are mounted on pivots 56 disposed off center with respect to the platforms so that they normally tend to assume the tilted position shown in Fig. 2. However, in the normal operation of the apparatus they are supported against tilting by a riffle plate 57 hinged at one end, as indicated at 58, and supported in the elevated position shown in Fig. 1 by means of a pair of arms 59 fixed to a shaft 60 suitably journaled in the housing K with one end projecting therefrom, as shown in Fig. 3, where it is provided with a worm gear 61 meshing with a worm 62 fixed to a shaft 63 provided with a hand wheel 64 by which the shaft can be rotated to actuate the shaft 60 in lowering or elevating the arms 59. The arms 59 are connected by an elongated roller 65 (Fig. 1) which has rolling contact with the bottom of the riffle plate 57. Rollers 66 depend from the tiltable platforms 47 and 48 to contact with the upper side of the riffle plate 57 in order to reduce friction and wear between the platforms and riffle plate.

Within the curved portions 51 and 54 of the stationary platforms rollers 67 and 68, respectively, are rotatable, and these rollers are provided with radial fingers 69 which, under rotation of the rollers, are movable in the direction of the arrows in Fig. 1 through suitable slots 70 (Fig. 8) formed in the stationary platforms. As illustrated in Fig. 8, the fingers 69 are in series of eight equidistantly spaced circumferentially of the roller 67 or 68, with the fingers of one series staggered with relation to the fingers of an adjacent series. This finger arrangement is for the purpose of producing an intermittent lifting or throwing action in respect to the particles of food remnants as will be more fully described hereinafter.

As shown in Fig. 8, the roller 67 is fixed to a shaft 71, and, as shown in Fig. 3, this shaft is operatively connected to a shaft 72 for the roller 68 by means of a chain and sprocket connection 73. The shaft 72 in turn is driven from the shaft 32 by a chain and sprocket connection 74. By means of the connections just described the rollers 67 and 68 are rotated simultaneously in a clockwise direction as when viewed in Fig. 1, and the rotative movement is such as to cause the fingers to slowly move upwardly and then downwardly and forwardly toward the discharge end of the table.

The plate 38 is formed of any suitable metal capable of being readily magnetized, and disposed beneath this plate are a plurality of electro-magnets 75 supported on a plate 76 which may form one pole piece for all of the magnets. As shown in Fig. 11, the magnets are provided with a circuit including a battery B or other source of current, and the supply of current to the magnets from the battery B is controlled by means of a switch S normally urged to open position but adapted to be closed by the platform 47 when the latter is in the normal position as illustrated in solid lines in Fig. 11. When the platform is moved to tilted position the switch S automatically opens, thus disrupting the circuit and deenergizing the magnets. When the magnets are energized the platform 38 is magnetized for the purpose of attracting and retaining metal particles found in the food remnants. In the operation of the apparatus the metal particles accumulate on the surface of the platform 38 but are adapted to be discharged therefrom and into an inclined chute 77 and finally into a receptacle 78 at the lower end of the chute and exteriorly of the housing K. The upper end of the chute 77 is normally closed by the platform 47, but when the platform is moved to tilted position, as shown in Fig. 2, the upper end of the chute is opened to permit the metal particles to be discharged thereinto. As shown in Fig. 1, this platform 47 has a depending lip 47ª which serves to deflect the food remnants and their juices onto the riffle plate 57, as will be understood. The platforms 47, 48, and 55 are all perforated as illustrated in Fig. 12 to allow the relatively small particles of food remnants and particles of unrelated matter to percolate onto the riffle plate 57 where the separation of the particles of unrelated matter of the food remnants is effected. To this end the upper surface of the riffle plate is serrated transversely, as best seen in Fig. 13, the serrations indicated at 79 having a cross-sectional contour corresponding to that of a saw tooth so as to discharge the unrelated matters, as well as bones discharged thereon from the platforms 47 and 48, onto the endless conveyor belt 81. This belt 81 is disposed within a bin 82 and is trained about rollers 83 and 84 with the outer surface of the belt provided with transverse ribs 85. The roller 84 is driven from the shaft 71 by a chain and sprocket connection 86 and in such direction that the upper stretch of the belt moves inwardly of the bin to discharge food material disposed thereon onto the bottom of the bin so that the lower stretch of belt in moving outwardly of the bin will cause the ribs to have scraping engagement with the bin bottom and thereby effectively discharge the material at the outer end of the bin and exteriorly of the housing K.

As previously described, the table T is mounted for oscillation on the frame F, and this table is adapted to be oscillated or vibrated through the provision of a shaft 87 having a cam 88 eccentric on the shaft and surrounded by a collar 89 to which latter is connected a rod 90 pivoted as indicated at 91 to the receiving end of the table T, all as clearly shown in Fig. 6. The shaft 87 is operatively connected to the motor shaft 33 through a pulley and belt connection 92, as shown in Figs. 3 and 4.

The operation of the apparatus is as follows:

With the parts in the position shown in Fig. 1 and the hopper 20 supplied with a quantity of food remnants containing unrelated matters such as particles of metal, china, and glass, batches of food remnants are intermittently discharged from the spout 22 onto the magnetized platform 38 as determined by the opening and closing of the gates 23 and 24. Each batch of material upon being discharged onto the platform 38 is uniformly spread over the surface thereof by reason of the vibratory movement of the platform, and because of the difference in specific gravity between the particles of food remnants and the metal particles, the latter are precipitated to the bottom of the mass and into contact with the platform where they are subjected to the existing magnetic flux and thus retained against displacement from the platform. In the meanwhile the particles of food remnants and other unrelated matter incapable of being magnetized is fed forwardly under the vibratory movement of the table coupled with the gravitational action exerted by reason of the inclination of the table as determined by an adjustment of the screw 44. The material fed in this manner progresses from the platform 38 onto the platform 47, and by virtue of the perforations in the platform the small particles of food remnants, together with the juices and the small particles of unrelated matter, such as glass and china, are deposited on the riffle plate 57. The remaining large particles of food remnants, including bones, are fed forwardly and upwardly of the inclined surface 49 where they are subjected to the action of the rotating fingers 69. The fingers in moving slowly upward through the slots of the inclined surface 49 function to project the bones and any other relatively large and solid particles rearwardly returning them to the platform 47. The other particles of remnants are not projected by the fingers but move onto the surface of the roller 67 and are thus carried by the fingers and the roller and finally deposited on the inclined surface 50 from whence they gravitate onto the platform 48. Under the vibratory and gravitational actions the food remnants deposited on the platform 48 are fed upwardly of the surface 52 where they are acted upon by the fingers 69 and the roller 68 in the same manner as that described in connection with the fingers 69 and the roller 67.

As the platform 48 is likewise perforated, any remaining juices and small particles of food remnants and unrelated matters are deposited onto the riffle plate 57, the roller 68 and its fingers operating to separate any remaining bones and other relatively large particles and discharge them back onto the platform 48. The remaining food remnants are fed forwardly by the fingers and roller and discharged onto the inclined surface 53 and finally onto the platform 55, from which they are discharged free of all unrelated matters into a suitable receptacle R disposed within the housing K.

The small particles of food remnants as deposited on the riffle plate 57 are progressively fed toward the pivoted end of the plate and finally discharged to the receptacle R, the grooves formed by the serrations trapping and thus separating the particles of unrelated matters such as glass and china from the food remnants by reason of the difference in specific gravity of the two. It will be understood that the particles of food remnants, which are the lighter of the two, pass over the serrated surface of the riffle plate under the vibratory movement of the table and the gravitational action produced by reason of its inclination.

In practice, the batches of food remnants are delivered to the platform 38 at such timed intervals to permit each batch to pass from the platform 38 and the separating treatment well proceeded with before a succeeding batch is discharged onto the platform.

In order that the apparatus may operate to a higher degree of efficiency in separating or removing the unrelated matters from the food remnants, it is necessary from time to time to clear the platforms 38, 47, and 48, and the riffle plate 57, of the respective unrelated matters. This clearing operation is effected by lowering of the riffle plate 57 to the position shown in Fig. 2, thereby permitting the platforms 47 and 48 to move to tilted position in which bones and other relatively large particles of undesirable matter are discharged onto the riffle plate and from the latter onto the conveyor belt 81. By spraying the riffle plate with water from the pipe 80 the particles of glass, china, and the like are removed as has been described. With movement of the platform 47 to tilted position the electro-magnets 75 are deenergized and under continued vibratory movement of the platform 38 the particles of metal thereon are discharged into the chute 77 and finally into the receptacle 78. By elevating the riffle 57 the platforms 47 and 48 are returned to normal position and the magnets 75 again energized by closing the switch S through movement of the platform 47 to normal position.

Although I have herein shown and described only one form of separation apparatus for food remnants embodying my invention, it is to be understood that various changes and modifications may be made herein without departing from the spirit of the invention and the spirit and scope of the appended claims.

I claim:

1. An apparatus of the character described comprising a table mounted for vibratory movement and having a food remnant receiving portion and a food remnant discharging portion, means for inclining the table downwardly to its discharging portion, means for vibrating the table to cause food remnants and unrelated matters delivered to the receiving portion to gravitate toward the discharging portion, and means for restraining metal particles against gravitational feeding movement downwardly of the table yet permitting said feed of the food remnants, whereby the metal particles are separated from the food remnants.

2. An apparatus as embodied in claim 1 wherein the means for inclining the table is adjustable to vary the inclination of the table and to thereby vary the gravitational feeding movement of the food remnants.

3. An apparatus of the character described comprising a table mounted for vibratory movement and having a food remnant receiving portion and a food remnant discharging portion, means for inclining the table downwardly to its discharging portion, means for vibrating the table to cause food remnants and unrelated matters delivered to the receiving portion to gravitate toward the discharging portion, screening means on the table for separating out the small particles of food remnants and the small unrelated particles, and means below the screening means for receiving and separating the food particles from the unrelated particles and finally discharging the former free of the latter.

4. An apparatus of the character described comprising a table mounted for vibratory movement and having a food remnant receiving portion and a food remnant discharging portion, means for inclining the table downwardly to its discharging portion, means for vibrating the table to cause food remnants and unrelated matters delivered to the receiving portion to gravitate toward the discharging portion, screening means on the table for separating out the small particles of food remnants and the small unrelated particles, and a riffle below the screening means for receiving the particles and under its vibratory movement and by reason of its inclination separating the food particles from the unrelated particles and finally discharging the former free of the latter.

5. An apparatus of the character described comprising a table mounted for vibratory movement and having a food remnant receiving portion and a food remnant discharging portion, means for inclining the table downwardly to its discharging portion, means for vibrating the table to cause food remnants and unrelated matters delivered to the receiving portion to gravitate toward the discharging portion, means for restraining magnetizable particles against gravitational feeding movement downwardly of the table yet permitting said feed of the food remnants, whereby the magnetizable particles are separated from the food remnants, screening means on the table for separating out the small particles of food remnants and the small unrelated particles, and means below the screening means for receiving and separating the food particles from the unrelated particles and finally discharging the former free of the latter.

6. An apparatus of the character described comprising a table mounted for vibratory movement and having a food remnant receiving portion and a food remnant discharging portion, means for inclining the table downwardly to its discharging portion, means for vibrating the table to cause food remnants and unrelated matters delivered to the receiving portion to gravitate toward the discharging portion, means for restraining magnetizable particles against gravitational feeding movement downwardly of the table yet permitting said feed of the food remnants, whereby the magnetizable particles are separated from the food remnants, screening means on the table for separating out the small particles of food remnants and the small unrelated particles, and a riffle below the screening means for receiving the particles and under its vibratory movement and by reason of its inclination separating the food particles from the unrelated particles and finally discharging the former free of the latter.

7. An apparatus as embodied in claim 4 wherein the riffle is movable to a position in which the unrelated particles retained thereon are discharged from the riffle.

8. In an apparatus of the character described, an inclined and vibrating table having openings therein to permit percolation therethrough of small particles of food remnants and unrelated matters, and means beneath the table for receiving and separating the particles of food remnants from the unrelated matters.

9. An apparatus as embodied in claim 8 wherein the table includes platforms certain of which are movable to a tilted position for dumping of the matter thereon while other platforms are inclined to cause matter thereon to gravitate through the openings provided by the movable platforms when tilted.

10. In an apparatus of the character described, an inclined vibrating platform having an upwardly inclined portion, a rotatable member positioned at the upper end of the inclined portion and having fingers, and means for rotating the member to cause the fingers to move upwardly through the inclined portion and then forwardly away from the latter whereby relatively large particles of food remnants fed upwardly of the inclined portion are ejected and discharged downwardly of the inclined portion while the smaller particles pass between the fingers and onto said member to be fed by the latter away from the inclined portion.

11. In an apparatus as embodied in claim 10 wherein the fingers are arranged in series extending circumferentially of the member with the fingers of one series staggered with relation to the fingers of an adjacent series.

12. In an apparatus of the character described, a table, means for vibrating the table to cause food remnants deposited thereon to be fed along the table, portions of said table being tiltable to dump matter therefrom, and means aiding food remnants to be fed along the table but ejecting relatively large particles and returning them to the tiltable portions.

13. In an apparatus of the character described, a table having tiltable platforms with interposed inclined stationary platforms, the latter being arranged in pairs with the platforms of each pair reversely inclined and spaced, a roller between the inclined platforms of each pair, and fingers on the rollers.

14. An apparatus of the character described comprising a table, means for vibrating the table to cause food remnants and unrelated matters deposited thereon to move over the surface of the table, screening means on the table for separating out the small particles of food remnants and the small unrelated particles, and means for restraining magnetizable particles against movement over the surface of the table for separating the magnetizable particles from the food remnants, and a riffle below the screening means for receiving the particles and under its vibratory movement separating the food particles from the unrelated particles and finally discharging the former free of the latter.

15. An apparatus of the character described comprising a table, means for vibrating the table to cause food remnants and unrelated matters deposited thereon to move over the surface of the table, screening means on the table for separating out the small particles of food remnants and the small unrelated particles, means for receiving and separating the food particles from the unrelated particles and finally discharging the former free of the latter, and means for restraining magnetizable particles against movement over the surface of the table for separating said particles from the food remnants.

16. In an apparatus of the character described, an inclined vibrating table having relatively stationary platforms each provided with oppositely inclined portions spaced apart, and a rotatable member between the inclined portions provided with fingers.

17. In an apparatus of the character described, an inclined vibrating table having stationary platforms each provided with oppositely inclined portions spaced apart, and slotted, and a rotatable member between the inclined portions provided with fingers movable through the slots of the portions.

18. In an apparatus of the character described, a vibrating table having stationary platforms and intervening tiltable and perforated platforms, each stationary platform including oppositely inclined portions spaced apart and slotted, and a rotatable member between the inclined portions provided with fingers movable through the slots of the inclined portions.

19. In an apparatus of the character described, a vibrating table having stationary platforms and intervening tiltable and perforated platforms, each stationary platform including oppositely inclined portions spaced apart and slotted, a rotatable member between the inclined portions provided with fingers movable through the slots of the inclined portions, and a vibrating riffle below the table supported for movement to occupy one position paralleling the platform and in which the riffle supports the tiltable platforms against tilting and another position in which the riffle is inclined to permit the platforms to tilt and for discharging material from the riffle.

RALF E. WEBER.